M. JAEGER.
ANIMAL TRAP.
APPLICATION FILED AUG. 31, 1906.

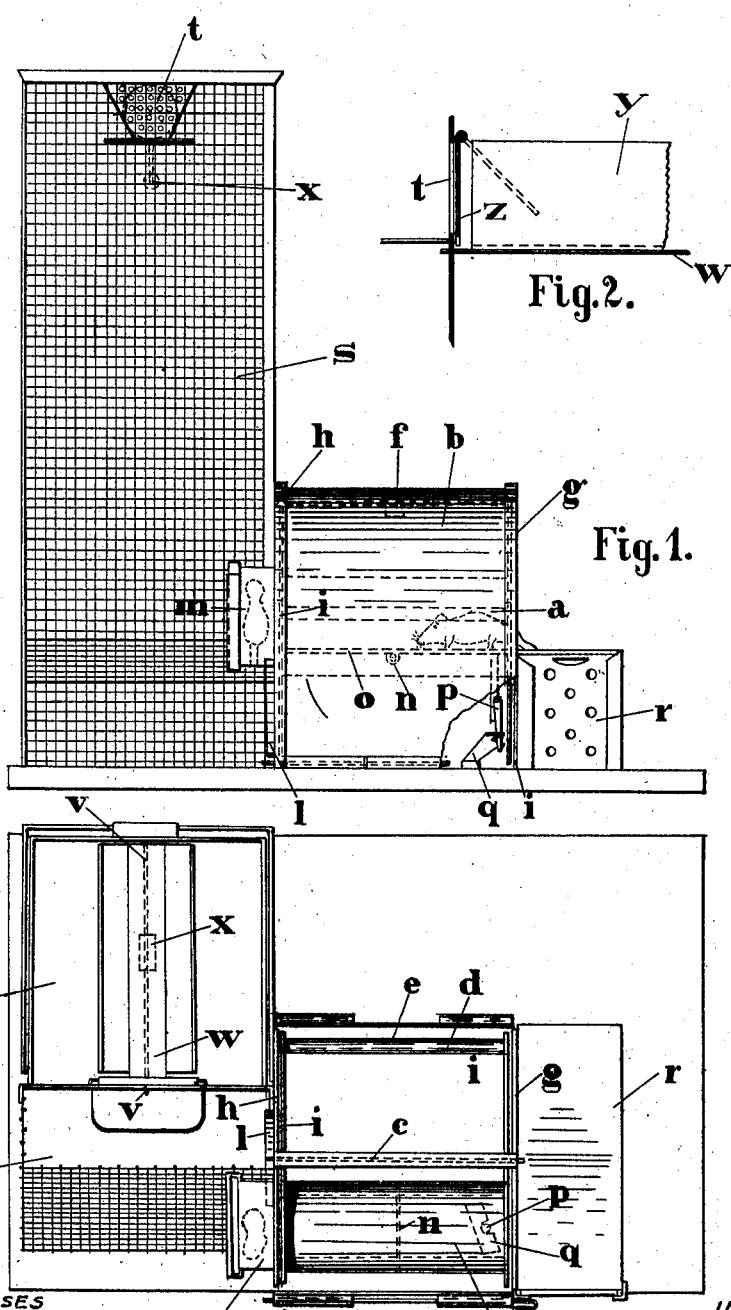

963,574.

Patented July 5, 1910.
2 SHEETS—SHEET 2.

WITNESSES
G. V. Rasmussen
Fred A. Klein.

INVENTOR
Michael Jaeger
BY
Bresen Threet
ATTORNEYS

THE NORRIS PETERS CO., WASHINGTON, D. C.

UNITED STATES PATENT OFFICE.

MICHAEL JAEGER, OF DARMSTADT, GERMANY.

ANIMAL-TRAP.

963,574.      Specification of Letters Patent.      Patented July 5, 1910.

Application filed August 31, 1906. Serial No. 332,727.

*To all whom it may concern:*

Be it known that I, MICHAEL JAEGER, a subject of the Emperor of Germany, and a resident of the city of Darmstadt, Germany, have invented certain new and useful Improvements in Animal-Traps, of which the following is a specification.

My invention relates to animal traps and more particularly to traps for rats and mice and has for its object to improve the construction of traps of this kind so as to make it impossible for the animal to escape from the trap and to provide said traps with means for quickly killing the entrapped animal.

My invention will be fully described hereinafter and the features of novelty will be pointed out in the appended claim.

Reference is to be had to the accompanying drawings in which—

Figure 4:
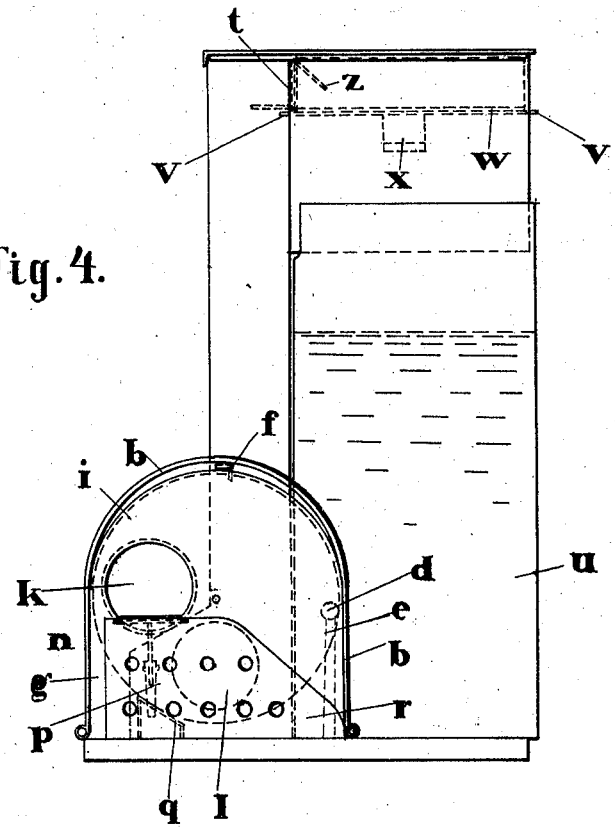
Figure 5:
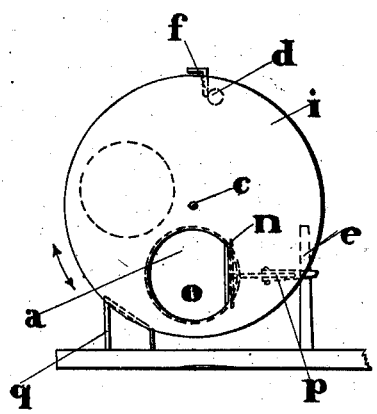

Figure 1 is a side elevation of my improved trap; Fig. 2 is a detail of a portion of the upper part thereof; Fig. 3 is a plan view of said trap; Fig. 4 is an end view thereof, and Fig. 5 is a detail end view of the drum showing it in a different position.

$a$ is a cylinder which is suported on a drum $b$ which drum is mounted to rotate on an axle $c$ and is provided with a balancing weight $d$.

$e$ is a stop for limiting the movement of the drum $b$ in one direction and $f$ is a stop for limiting the movement of the drum in the opposite direction.

The drum $b$ is located between walls $g$ and $h$ so that the ends $i$ of said drum travel adjacent to said walls $g$ and $h$. The wall $g$ is provided with an opening $k$ which registers with one end of the cylinder $a$ when the device is in its normal position. The opposite end of said cylinder supported adjacent to a corresponding opening in the rear wall, which opening is preferably covered with a screen or like device to prevent access to a chamber $m$ secured to the wall $h$ on the side opposite to that which is toward the end of the cylinder $a$. The chamber $m$ is adapted to contain a bait for the purpose of luring the animal into the cylinder $a$. The wall $h$ is further provided with another opening $l$ the purpose of which will be more fully described hereinafter. A swinging platform $o$ pivoted at $n$ is secured in the cylinder $a$ and runs lengthwise thereof and is provided with a suitable catch $p$ which engages a notch in a member $q$ for maintaining the drum $b$ in its normal position.

$r$ represents a chamber in which a suitable bait may be located the object of which will be clearly disclosed hereinafter.

$s$ is a wire net cage with which the opening $l$ communicates and which is provided near its top with an opening $t$ leading to a platform $w$ which is pivoted on the trunnion $v$ from which also depends the weight $x$. The opening $t$ is closed by a swinging door $z$ pivoted at its top so as to be capable of only swinging inward or toward the platform $w$. This door $z$ is preferably made transparent or of wire netting.

$y$ are walls which extend along each side of the platform $w$ beneath which platform is located a receptacle $u$ which contains water or other suitable liquid for quickly killing the entrapped animal as will be more clearly described hereinafter.

In operation, bait is placed in the chamber $r$ which is closed at one end by a perforated slide so that the odor of said bait may penetrate to the outer air, and the bait is also placed in the chamber $m$. The animal smelling the bait in the chamber $r$ will try to get at it and finding it impossible to do so will mount to the top of said chamber and the bait in the chamber $m$ attracting the animal to this point. It will then pass through the opening $k$ in an effort to get at the said bait, and will pass into the cylinder $a$ on to the platform $o$. As soon as the animal has passed the pivot $n$ the platform $o$ will be tilted by the weight of the animal, sufficiently to disengage the catch $p$ from the notch in the member $q$. The weight of the animal will now cause the drum $b$ to rotate on its axle $c$ so that the cylinder $a$ will be in the position shown in Fig. 5 with its one end adjacent to the opening $l$ and its other end closed by the wall $g$. The movement of the drum in this direction is limited by the stop $f$ which is engaged by the weight $d$. The animal now passes through the opening $l$ into the cage $s$ and as soon as it has done so, the drum being relieved of its weight will be returned to its initial position by the weight $d$, the movement in this direction being limited by the stop $e$. The animal now seeks to escape and climbs the walls of the cage and finally reaches a small platform located in front of the opening $t$ and door $z$. The animal seeing an evident means of escape passes through the opening t and swings the door z on its pivot and finally reaches the platform w. In an effort to return on finding it can not escape, the animal tilts this platform w on its pivot v and is thus precipated into the water or other liquid contained in the chamber u where it is drowned. Escape from my improved trap is impossible and the animal once having started to enter the trap cannot return.

Various modifications may be made without departing from the nature of my invention as defined in the claim.

I claim—

An animal trap comprising a cage, a rotatable drum carrying a cylinder normally out of communication with said cage and which is adapted to be brought into communication with the cage, means for locking said drum in its normal position, a tripping device for releasing the locking means to permit the drum to be partly rotated, means for returning said drum to its initial position, a stop arranged to engage said means for limiting the movement of the drum in one direction and another stop also adapted to engage said means for limiting the movement of the drum in the opposite direction.

In testimony whereof I have hereunto signed my name in the presence of two subscribing witnesses.

MICHAEL JAEGER.

Witnesses:
    WALTER HAIESIED,
    WALTER SCHUMANN.